United States Patent [19]

Hashiguchi

[11] Patent Number: 5,114,649
[45] Date of Patent: May 19, 1992

[54] PROCESS FOR IMPROVING AN ADHERING PROPERTY OF THE ADHERING SURFACE OF AN UNSATURATED POLYESTER RESIN

[75] Inventor: Hiroaki Hashiguchi, Utsunomiya, Japan

[73] Assignee: Prio Co. Incorporated, Utsunomiya, Japan

[21] Appl. No.: 498,649

[22] Filed: Mar. 26, 1990

[30] Foreign Application Priority Data

Mar. 24, 1989 [JP] Japan ................................ 1-72822
Mar. 24, 1989 [JP] Japan ................................ 1-72823

[51] Int. Cl.$^5$ ...................... B29C 39/10; B29C 41/20
[52] U.S. Cl. .................................. 264/139; 156/242; 156/247; 264/257
[58] Field of Search .............. 264/257, 258, 139, 162; 156/242, 247, 249

[56] References Cited

U.S. PATENT DOCUMENTS

| | | | |
|---|---|---|---|
| 3,012,287 | 12/1961 | Tucker | 264/139 |
| 3,339,275 | 9/1967 | Anderson et al. | 264/258 |
| 3,652,359 | 3/1972 | Decker | 156/310 |
| 4,731,283 | 3/1988 | Sakane et al. | 156/308.6 |

*Primary Examiner*—Jill L. Heitbrink
*Attorney, Agent, or Firm*—Wenderoth, Lind & Ponack

[57] ABSTRACT

A process for improving chemical and physical adhesive properties of an adhering surface of an unsaturated polyester resin to be adhered onto an article prepared from the unsaturated polyester resin which includes:
   laying a cloth on a portion of a mold, the cloth having a strong adhesivity for the unsaturated polyester resin;
   impregnating the cloth with the unsaturated polyester resin and leaving the impregnated resin on said mold for hardening for a given time to form a sheet; and
   stripping the cloth which is impregnated with the hardened unsaturated polyester resin from the unsaturated polyester resin to form an irregular or rugged adhering surface.

2 Claims, 2 Drawing Sheets

PROCESS FOR IMPROVING AN ADHERING PROPERTY OF THE ADHERING SURFACE OF AN UNSATURATED POLYESTER RESIN

BACKGROUND OF THE INVENTION

1. Field of the Invention

This invention relates to a process for improving an adhesive property of an adhering surface of an unsaturated polyester resin, and a sheet used for the process.

More particularly, this invention relates to a process for improving an adhesive property of the adhering surface of molded articles such as a bath tub, a digestor chamber, a gas pipe, a hull, a water service pipe or the like which is prepared from an unsaturated polyester resin, and a sheet used for the process.

2. Description of the Prior Art

Molded articles prepared from fiberglass reinforced plastics such as an unsaturated polyester resin have the following defects:

(1) The molded article has a low adhesiveness on its adhering portion because a sliding surface is formed when an unsaturated polyester resin used for fiber-glass reinforced plastics is left for hardening.

(2) Hardness of the adhering surface of the molded article is considerably high.

In order to increase an adhesive property of an unsaturated polyester resin, there have been proposed a sandblasting or a rotary file for improving an adhesion each of the adhering surface of the desired article or of the connected portions of the two pipes. In the sandblasting, a blast of air or stream laden with sand is applied under strong injection pressure upon the adhering or connecting portions where strong adhesivness are required so as to form a irregular or rugged adhering surface.

In the conventional sandblasting, however, dust containing resinous powder is spread around to injure a worker's health. In addition, the sandblasting device becomes complicated and large, its handling is troublesome, and its productivity is low.

The file polishing has the defects that the polishing is easily varied, it is difficult to carry out production control, resinous powder is spread as in the sandblasting to injure a worker's health, and its productivity is low as well.

The present inventor has carried out the study of eliminating the foregoing disadvantages, and has succeeded in providing a process for improving an adhesive property of the adhering surface of molded articles prepared from an unsaturated polyester resin whereby the unsaturated polyester resin is adhered with a piece of cloth in order to form a strong adhering surface without spreading the detrimental resinous powder.

BRIEF SUMMARY OF INVENTION

Objects of the Invention

It is the primary object of the present invention to provide a process for improving an adhesive property of the adhering surface of a molded article which is prepared from an unsaturated polyester resin and is adhered with a piece of cloth whereby the molded article can be easily and rigidly adhered upon the desired article.

Another object of this invention is to provide a process for improving an adhesive property of the adhering surface of a molded article which is prepared from an unsaturated polyester resin and is adhered with a piece of cloth whereby an adhesiveness of the adhering surface is remarkably strengthened.

Another object of this invention is to provide a process for improving an adhesive property of the adhering surface of a molded article which is prepared from an unsaturated polyester resin and is adhered with a piece of cloth whereby spreading of resinous powder which has been unavoidable in the conventional sandblasting is prevented in order not to injure a worker's health.

Another object of this invention is to provide a process for improving an adhesive property of the adhering surface of a molded article whereby the variable file polishing is abolished, thereby avoiding spreading of detrimental resinous powder which has been unavoidable in the conventional file polishing.

Another object of this invention is to provide a process for improving an adhesive property of the adhering surface of a molded article whereby the complicated and large sandblasting or file polishing device can be not used and the operation can be carried out easily within a short time.

Another object of this invention is to provide a process for improving an adhesive property of the adhering surface of a molded article whereby its productivity can be remarkably improved.

Another object of this invention is to provide a process for improving an adhesive property of the adhering surface of a molded article whereby an irregular or rugged adhering surface is formed with an adhesion of a piece of cloth, and also gigging of the adhereing surface is formed on the surface with a stripping of the cloth from the adhering surface of a molded article in order to remarkably improve the adhering surface and also to increase its adhesive strength.

Another object of this invention is to provide a process for improving an adhesive property of the adhering surface of a molded article whereby an adhesiveness stronger than any other adhesive is obtained on the adhering surface of a molded article which is prepared from an unsaturated polyester resin.

Another object of this invention is to provide a process for increasing an adhesive property of the adhering surface of a molded article which is prepared from an unsaturated polyester resin whereby an adhering surface is considerably increased with exposure of an unreacted functional group and also with gigging of the adhereing surface.

Another object of this invention is to provide a process for increasing an adhesive property of the adhering surface of a molded article which is prepared from an unsaturated polyester resin whereby an excellent and strong adhesion is carried out not by presumably physical bonding, but by chemical adhesion.

Another object of this invention is to provide a process for increasing an adhesive property of the adhering surface of a molded article which is prepared from an unsaturated polyester resin whereby the handling is shortened, and the safety and health of a worker will continue to be improved in a reasonable manner which takes into account economic feasibility and the availability of technical capability.

Another object of this invention is to provide a sheet including a piece of film integrally adhered with a piece of cloth for use in a process whereby the unsaturated polyester resin is suspened to impregnate into the cloth in order to increase an adhesive property of the adhering surface of a molded article which is prepared from the unsaturated polyester resin.

A still further object of this invention is to provide a process for increasing an adhesive property of the adhering surface of a molded article which is prepared from an unsaturated polyester resin whereby the process is performed easily without causing any public nuisance.

BRIEF DESCRIPTION OF THE DRAWING

The above and other objects, features and advantages of this invention will become more apparent from reading the following description of the preferred embodiment taken in connection with the accompanying drawing in which:

FIG. 2A is an enlarged vertical longitudinal fragmentary sectional view of a mold, a piece of cloth adhered on the mold and an unsaturated polyester resin;

FIG. 2B is an enlarged vertical longitudinal fragmentary sectional view of a piece of cloth and an unsaturated polyester resin adhered on the cloth, from which a mold is taken:

FIG. 2C is an enlarged vertical longitudinal fragmentary sectional view of a piece of cloth and an unsaturated polyester resin, from which the cloth is partially stripped;

FIG. 4A is an enlarged vertical longitudinal fragmentary sectional view of a mold, a piece of sheet adhered on the mold and an unsaturated polyester resin;

FIG. 4B is an enlarged vertical longitudinal fragmentary sectional view of a piece of sheet and an unsaturated polyester resin, from which a mold is taken; and FIG. 4C is an enlarged vertical longitudinal fragmentary sectional view of a piece of sheet and an unsaturated polyester resin, from which the sheet is partially stripped.

DETAILED DESCRIPTION OF THE PREFERRED EMBODIMENT

Figure 1:
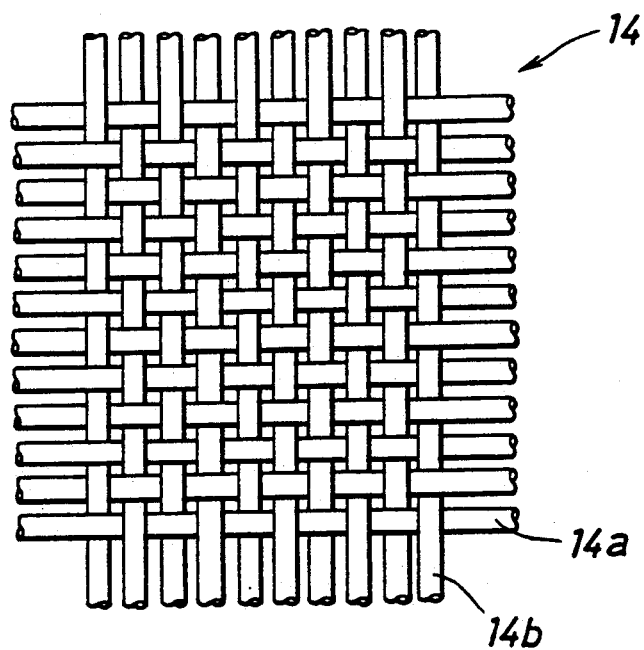
FIG. 1 is an enlarged elevation, partly in section, of a piece of cloth which is adhered on a mold used for a process for increasing an adhesive property of the adhering surface of a molded article which is prepared from an unsaturated polyester resin.

Referring first to FIGS. 1, 2A–2C, positioning is performed on the desired portion on a mold 10. A piece of cloth 14 having an adhesivity on an unsaturated polyester resin is laid on the positioned portion of the mold 10.

The cloth 14 is formed by weaving a number of wefts 14a and warps 14b that run crosswise, but it may be preferable to adopt a nonwoven fabric.

The cloth 14 has an irregular surface when it is observed microscopically and it must have the adhesivity. But it should be borne in mind that the adhesivity need not to be so strong, but it may be strong enough to tear away another cloth when it is stripped off.

Liquid unsaturated polyester resin 18 is impregnated onto the desired portion of the cloth 14 and on the mold 10, and left for hardening for a given time. If desired, heating is carried out in order to accelerate hardening of the liquid unsaturated polyester resin 18.

During this process, the cloth 14 is fully impregnated with the liquid unsaturated polyester resin 18 and left for hardening. But when the liquid unsaturated polyester resin 18 is impregnated into and beyond the cloth 14, the latter may be submerged in the unsaturated polyester resin 18.

Accordingly, it is necessary to pay attention to not apply more liquid unsaturated polyester resin 18 than is needed.

At the same time, it is necessary to pull the cloth 14 as strongly as possible not to cause wrinkles thereon when it is laid on the positioned portion of the mold 10.

Figure 2A:
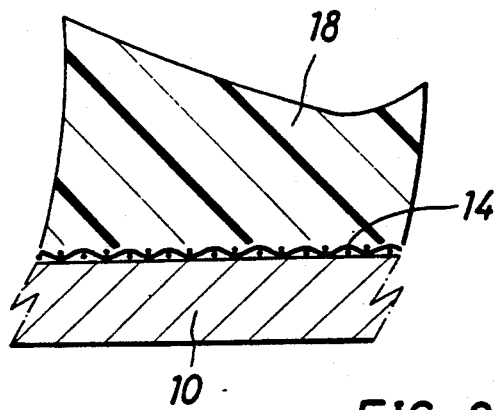
FIG. 2A, 2B and 2C are explanatory views illustrative of the process of this invention.
Figure 2B:
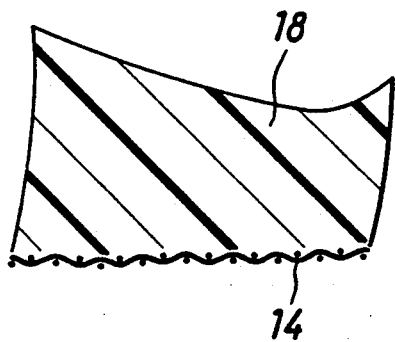
Figure 2C:
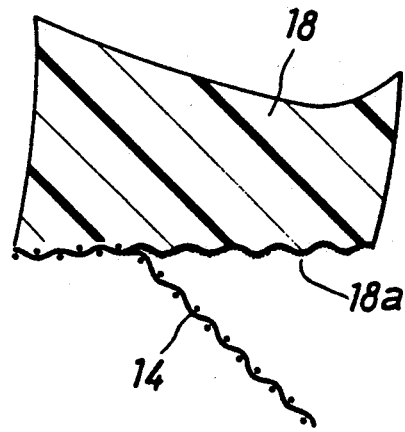

After the liquid unsaturated polyester resin has hardened, the mold 10 is removed as shown in FIG. 2B, and the sheet 16 is stripped by hand from the hardened unsaturated polyester resin as shown in FIG. 2C.

As a result, the sheet 16 consisting of the integratedly hardened unsaturated polyester resin 18 and the cloth 14 can be torn away from the hardened unsaturated polyester resin, thus forming a new irregular surface 18a on the hardened unsaturated polyester resin 18 as shown in FIG. 2C.

The newly formed irregular surface 18a on the unsaturated polyester resin 18 has been activated in three reasons in order to improve the adhesivity on the molded article prepared from the same material.

(1) Adhesivity of the irregular surface 18a on the unsaturated polyester resin 18 can be remarkably increased with an irregular surface of the cloth 14 when it is observed microscopically and also with an irregular surface of the unsaturated polyester resin which forms a female mold.

(2) Hardening reaction of the unsaturated polyester resin brings about a radical polymerization reaction by a polymerization monomer of an unsaturated alkyd resin, thus promoting decomposition reaction and growth reaction, when the unsaturated polyester resin has an unsaturated combination, the grown monoradical or polyradical is added to the unsaturated combination. In addition, the unsaturated combination combined with a monomer grows a crossing chain in order to promote hardening of the crossing chain.

Even after hardening of the crossing chain has been finished, all of the functional groups have not reacted, but a certain amount of the functional groups remain unreacted.

Consequently, when the cloth 14 adhered on the unsaturated polyester resin 18 is stripped, a new irregular adhering surface 18a is exposed on the hardened unsaturated polyester resin 18. The surface 18a contains an monomer which exhibits a strong adhesivity in the next adhering process.

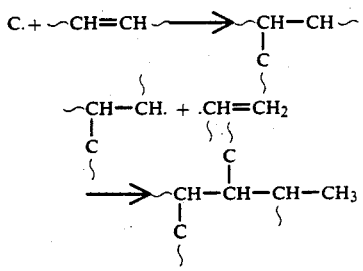

(3) The final activation has been performed by the increased adhering area with gigging of the adhering surface of the unsaturated polyester resin. Since the cloth 14 having an adhesivity on the unsaturated polyester resin has been selected, they are integrally adhered with each after the polyester resin has hardened. Consequently, when the cloth 14 is torn away from the hardended unsaturated polyester resin, it can be confirmed that the adhering surface has not only a simple irregular surface, but fine giggings are formed on the adhering surface in a torn away direction, thus remarkably increasing the adhering surface.

With reference to the embodiments shown in FIGS. 4A-4C, positioning is performed on the adhering portion of a mold 10, and subsequently a sheet 16 consisting of a piece of cloth 14 having an adhesivity on the unsaturated polyester resin and also a piece of film 20 is laid on the positioned portion of the mold 10. It should be noted that the film 20 can suspend permeation of the liquid unsaturated polyester resin 18.

As in the foregoing embodiment, the cloth 14 is formed by weaving a number of wefts 14a and warps 14b that run crosswise, but a nonwoven fabric may be preferably adopted if desired.

The cloth 14 has an irregular surface when it is observed microscopically and it must have the adhesivity. But the adhesivity need not be so strong, but may be strong enough to tear away another cloth when it is stripped off.

The film 20 which is integrally adhered on the cloth 4 can suspend permeation of the liquid unsaturated polyester resin into the sheet 16. The film 20 may be a piece of synthetic resin film integratedly adhered on the cloth 14.

Figure 4A:
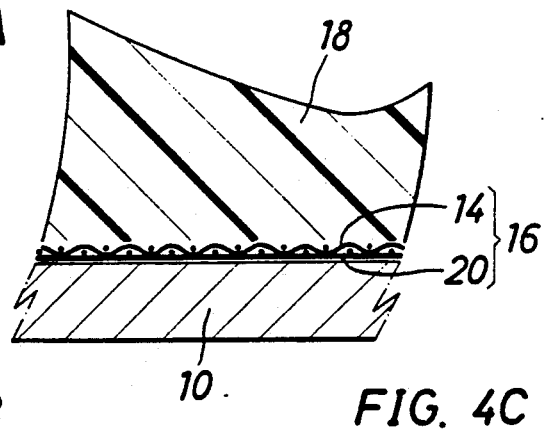
FIGS. 4A, 4B and 4C are explanatory views illustrative of the process according to a second embodiment of this invention.

In the next process, the sheet 16 is impregnated with liquid unsaturated polyester resin 18 and left for hardening for a certain time, and if necessary, heating is performed so as to accelerate hardening reaction as shown in FIG. 4A.

During this process, the liquid unsaturated polyester resin 18 is permeated and penetrated fully into the fabrics of the cloth 14. When the liquid unsaturated polyester resin 18 comes into contact with the film 20, the former is suspended to proceed.

Unless the film 20 is adhered on the cloth 14 of the sheet 16, the overflowed unsaturated polyester resin 18 crosses the cloth 14 and permeates into the cloth 14, resulting in that the cloth 14 is fully submerged in the unsaturated polyester resin 18. Accordingly, when the liquid polyester resin 18 has hardened it becomes difficult to strip the sheet 16 from the hardened polyester resin 18.

When the cloth 14 is made of soft fabrics, it is easily wrinkled. According to this invention, however, the sheet 16 consists of a piece of the cloth 14 and a piece of film 20 adhered integrally on the former so that it is very effective to control wrinkling.

Figure 4B:
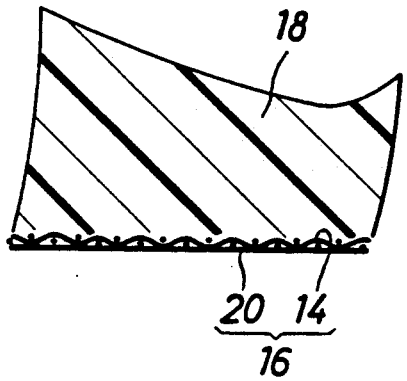
Figure 4C:
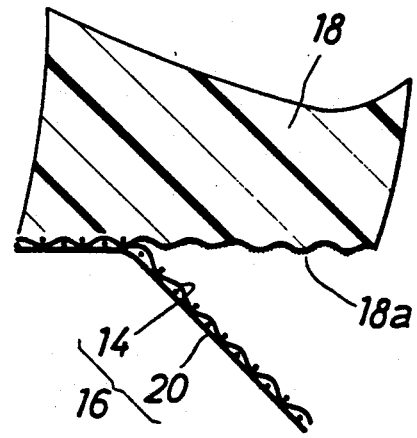

After the impregnated liquid unsaturated polyester resin 18 has hardened, the mold 10 is removed as shown in FIG. 4B, the sheet 16 is stripped from the hardened unsaturated polyester resin 18 by hand to expose a new irregular or rugged adhering surface 18a as shown in FIG. 4C.

As already explained in the embodiment shown in FIGS. 1-2G, the new adhering surface 18a has been activated with the three sam reasons as those of the first embodiment.

FUNCTION AND EFFECT OF THE INVENTION

As described in the foregoing paragraphs, it is only necessary according to the process of this invention to tear away the cloth 14 or the sheet 16 after the unsaturated polyester resin 18 has hardened from the hardened unsaturated polyester resin prior to adhsion to the desired article (not shown), with the result that the ordinary sandblasting or file polishing can be discontinued, thereby avoiding spreading of detrimental resinous powder.

At the same time, it is only necessary to strip the cloth 14 or the sheet 16 from the hardened unsaturated polyester resin 18 so that the operation can be remarkably shortened so as to improve its productivity.

In addition, the irregular or rugged adhering surface of the unsaturated polyester resin 18 can be activated with formation of the irregular or rugged adhering surface 18a and with exposure of the unreacted functional radical by stripping the cloth 14 or the sheet 16 from the hardened unsaturated polyester resin 18 respectively.

Figure 3:
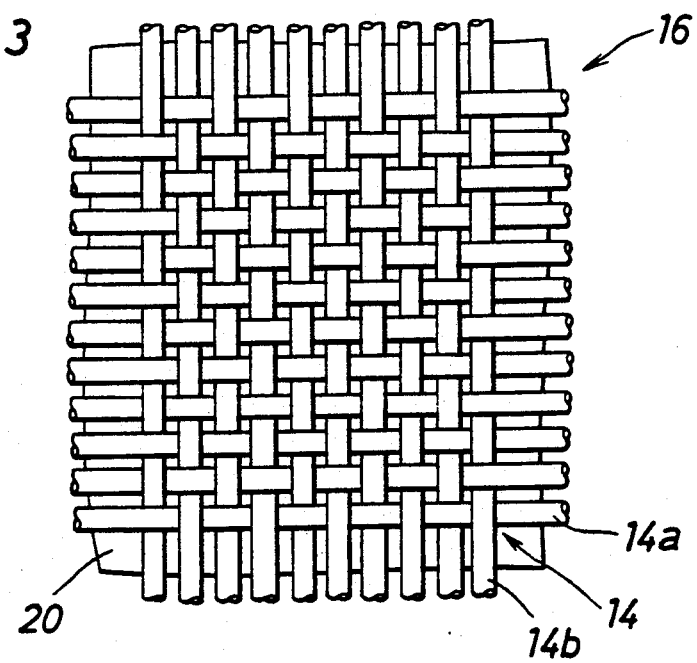
FIG. 3 is an enlarged elevation, partly in section, of a piece of sheet including a piece of cloth adhered with a piece of film, which sheet being adhered on a mold used for a process for increasing an adhesive property of the adhering surface of a molded article which is prepared from an unsaturated polyester resin according to a second embodiment of this invention.

In a second embodiment shown in FIGS. 3-4C the sheet 16 bas a piece of cloth 14 and a piece of film 20 which is integrally adhered on the cloth 14 so that permeation of the liquid unsaturated polyester resin 18 into the cloth 14 can be suspended so that the sheet 16 can be easily stripped from the hardened unsaturated polyester resin 18.

EXAMPLE 1

In order to mold a digestor chamber (not shown) from a fiberglass reinforced plastic, position is performed on the desired portion of a mold 10 for a body and its side portion of a digestor chamber. A piece of eloth 14 having an adhesivity is laid on the positioned portion of the mold 10, the cloth 14 consisting of plain woven polyester fabrics each having the fineness of 150 denier. Subsequently, liquid unsaturated polyester resin 18 mixed with its hardening (methyl ethyl ketone peroxide) is impregnated into the mold while glassfibers being mixed thereinto, and left for hardening for 24 hours.

After the unsaturated polyester resin 18 has hardened, an edge portion of the cloth 14 is gripped and stripped from the hardened polyester resin 18 to expose an activated irregular or rugged adhering surface 18a.

Test result of an adhesive strength is shown on the following table 1.

TABLE 1

| Test result of an adhesive strength | | | |
|---|---|---|---|
| | Breaking load: (kg) | Adhesive strength: (kg/cm²) | Broken conditions |
| Polished by file | 960 | 13.7 | No surface ruptured |

TABLE 1-continued

Test result of an adhesive strength

| polishing Treated by process of this invention | 2080 | 27.2 | Surface ruputured, strong adhesivity |
|---|---|---|---|

Conditions:

| Adhered width: | 6.3 cm |
|---|---|
| Adhered length: | 12.0 |
| Tensile strength: | 6 mm/min. |

As a result, it is apparent that the adhering surface 18a of the hardened unsaturated polyester resin 18 has been ruputured to expose a strong adhesivity on the positioned portion of the mold 10. At the same time, it has been confirmed that strong adhesion between the unsaturated polyester resin 18 and the desired article is based not on the presumable physical bonding, but on the chemical bonding.

EXAMPLE 2

In order to mold a digestor chamber (not shown) from a fiberglass reinforced plastic, positioning is performed on the desired portion of a mold 10 for a body and its side portion of a digestor chamber (not shown). A piece of a sheet 16 consisting of a piece cloth 14 and a piece of film 20 is laid on the positioned portion of the mold 10. The cloth 14 consists of plain woven polyester fabrics each having the fineness of 150 denier and a piece of film and thermally adhered on the former. Subsequently, liquid unsaturated polyester resin having a viscosity of 3.2 P and a thioxotropy of 3.3 and mixed with its hardening (methyl ethyl ketone peroxide) is impregnated into the mold 10 while glass-fibers being mixed thereto, and left for hardening for 24 hours.

After the unsaturated polyester resin 18 has hardened, an edge portion of the sheet 16 is gripped and stripped from the hardened polyester resin 18 to expose an activated irregular or rugged adhering surface 18a.

TABLE 2

Test result of an adhesive strength

| | Breaking load: (kg) | Adhesive strength: (kg/cm$^2$) | Broken conditions |
|---|---|---|---|
| Polished by file polishing | 960 | 13.7 | No surface ruptured |
| Treated by process of this invention | 2100 | 29.4 | Surface ruputured, strong adhesivity |

Conditions:

| Adhered width: | 6.3 cm |
|---|---|
| Adhered length: | 12.0 cm |
| Tensile strength: | 6 mm/min. |

As a result, it is apparent that the adhering surface 18a of the hardened unsaturated polyester resin 18 has been ruputured to expose a strong adhesivity on the positioned portion of the mold 10. At the same time, it has been confirmed that strong adhesion between the unsaturated polyester resin 18 and the desired article is based not on the presumable physical bonding, but on the chemical bonding.

What is claimed is:

1. A process for improving chemical and physical adhesive properties of an adhering surface of an unsaturated polyester resin to be adhered onto an article prepared from said unsaturated polyester resin which comprises:

laying a cloth on a portion of a mold, said cloth having a strong adhesivity for the unsaturated polyester resin;

impregnating the cloth with the unsaturated polyester resin and leaving the impregnated resin on said mold for hardening for a given time to form a sheet; and stripping said cloth which is impregnated with the hardened unsaturated polyester resin from said unsaturated polyester resin to form an irregular or rugged adhering surface.

2. A process for improving chemical and physical adhesive properties of an adhering surface of an unsaturated polyester resin to be adhered onto an article prepared from said unsaturated polyester resin which comprises:

laying a sheet on a portion of a mold, said sheet consisting of a piece of synthetic resin film which is integrally adhered to a cloth, and said cloth having a strong adhesivity for the unsaturated polyester resin;

impregnating the cloth of said sheet with unsaturated polyester resin and leaving said impregnated resin on said mold for hardening for a given time; and, stripping said sheet which is impregnated with the hardened unsaturated polyester resin from said unsaturated polyester resin to form an irregular or rugged adhering surface.

* * * * *